United States Patent
Hitosugi

(10) Patent No.: US 10,540,793 B2
(45) Date of Patent: Jan. 21, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Takayuki Hitosugi, Mitaka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 47 days.

(21) Appl. No.: 15/211,757

(22) Filed: Jul. 15, 2016

(65) Prior Publication Data
US 2017/0018057 A1 Jan. 19, 2017

(30) Foreign Application Priority Data
Jul. 17, 2015 (JP) .................................. 2015-142797

(51) Int. Cl.
*G06T 11/60* (2006.01)
*G06T 3/40* (2006.01)

(52) U.S. Cl.
CPC .............. *G06T 11/60* (2013.01); *G06T 3/40* (2013.01); *G06T 3/4038* (2013.01)

(58) Field of Classification Search
None
See application file for complete search history.

(56) References Cited

U.S. PATENT DOCUMENTS

| | | | | |
|---|---|---|---|---|
| 2010/0259557 A1* | 10/2010 | McMullen | .............. | G06T 11/60 345/619 |
| 2010/0315431 A1* | 12/2010 | Smith | ..................... | G06T 11/20 345/619 |
| 2011/0148892 A1* | 6/2011 | Shreiner | ................. | G06T 11/40 345/545 |
| 2012/0206447 A1* | 8/2012 | Hutchins | ............... | G06T 15/005 345/419 |

(Continued)

FOREIGN PATENT DOCUMENTS

JP 2013-161509 A 8/2013

OTHER PUBLICATIONS

TC46:"Open XML Paper Specification"; Standard ECMA-388, pp. 121-136.

*Primary Examiner* — YuJang Tswei
(74) *Attorney, Agent, or Firm* — Canon U.S.A., Inc. IP Division

(57) ABSTRACT

A method for generating a raster image according to a tile drawing command includes acquiring a tile drawing command for repeatedly rasterizing a specified object, determining whether an interval in which the object is repeated in a predetermined direction based on the acquired tile drawing command is an integer pixel width in a coordinate system of the raster image, generating, based on the acquired tile drawing command, another tile drawing command for repeatedly rasterizing the object in the predetermined direction in an interval of an integer pixel width in the coordinate system, wherein the generated another tile drawing command includes a plurality of pieces of information corre- (Continued)

sponding to a plurality of scaling factors, scaling, based on the another tile drawing command, the object to repeatedly rasterize the object in the predetermined direction.

11 Claims, 13 Drawing Sheets

(56) References Cited

U.S. PATENT DOCUMENTS

2015/0161805 A1* 6/2015 Glazer .................... H04L 67/10
                                                                345/441
2016/0148335 A1* 5/2016 Huang ...................... G06T 1/20
                                                                345/501

* cited by examiner

FIG. 3

| ITEM | VALUE |
|---|---|
| 300 — TILE ORIGIN | $(x, y)$ |
| 301 — TILE RANGE | $(width, height)$ |
| 302 — TILE COORDINATE TRANSFORMATION MATRIX | $\begin{pmatrix} a & 0 \\ 0 & d \\ 0 & 0 \end{pmatrix}$ |

FIG. 4

| ITEM | VALUE | |
|---|---|---|
| TILE ORIGIN | (1,2) | ~400 |
| TILE RANGE | (6,3) | ~401 |
| TILE COORDINATE TRANSFORMATION MATRIX | $\begin{pmatrix} 1.5 & 0 \\ 0 & 1.5 \\ 0 & 0 \end{pmatrix}$ | ~402 |

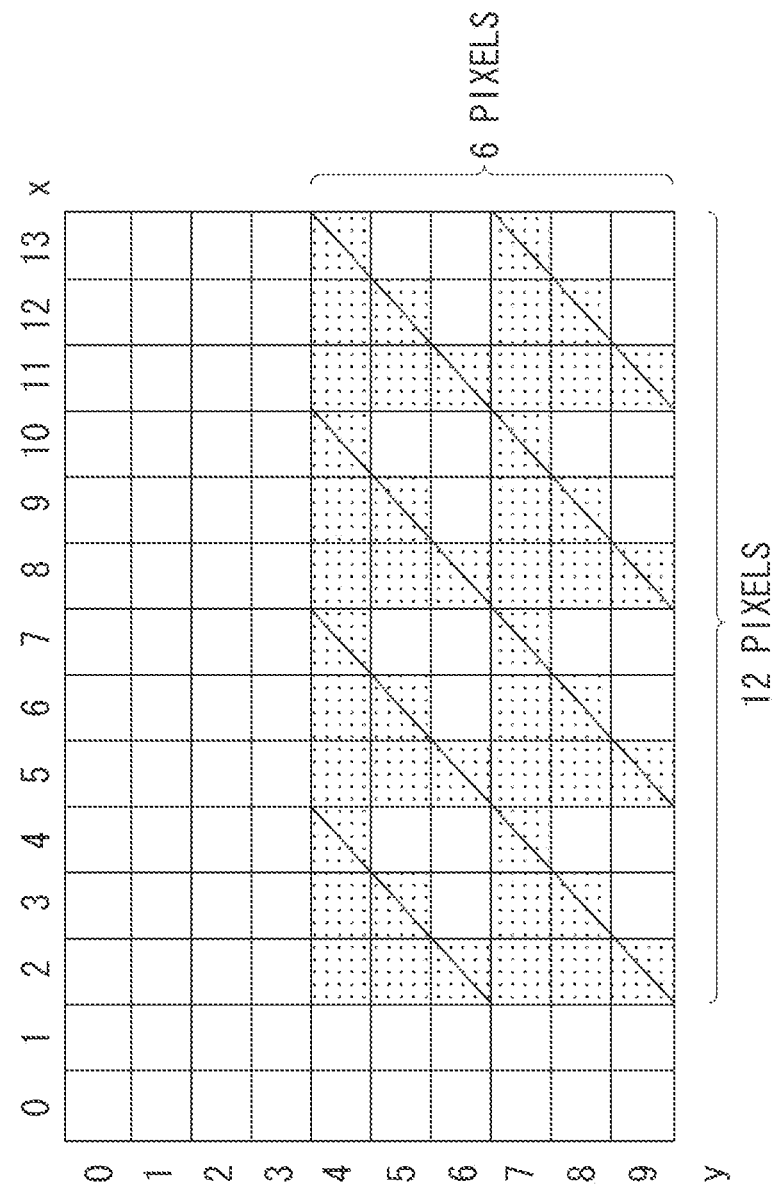
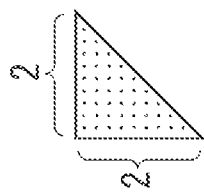

FIG. 8

| ITEM | VALUE |
| --- | --- |
| 800 — TILE ORIGIN | (x, y) |
| 801 — TILE RANGE | (width, height) |
| 802 — TILE COORDINATE TRANSFORMATION MATRIX [i, j] | $\begin{pmatrix} a[i,j] & 0 \\ 0 & d[i,j] \\ 0 & 0 \end{pmatrix}$ |
| 803 — CARRY INTERVAL | (lw, lh) |

FIG. 9A

| ITEM | VALUE | |
|---|---|---|
| TILE ORIGIN | (1, 2) | ~900 |
| TILE RANGE | (7, 3.5) | ~901 |
| TILE COORDINATE TRANSFORMATION MATRIX | $\begin{pmatrix} 1.25 & 0 \\ 0 & 1.25 \\ 0 & 0 \end{pmatrix}$ | ~902 |

FIG. 9B

| ITEM | VALUE | |
|---|---|---|
| TILE ORIGIN | (1, 2) | ~903 |
| TILE RANGE | (7, 3.5) | ~904 |
| TILE COORDINATE TRANSFORMATION MATRIX[0, 0] | $\begin{pmatrix} 1 & 0 \\ 0 & 1 \\ 0 & 0 \end{pmatrix}$ | ~905 |
| TILE COORDINATE TRANSFORMATION MATRIX[0, 1] | $\begin{pmatrix} 1 & 0 \\ 0 & 2 \\ 0 & 0 \end{pmatrix}$ | ~906 |
| TILE COORDINATE TRANSFORMATION MATRIX[1, 0] | $\begin{pmatrix} 1.5 & 0 \\ 0 & 1 \\ 0 & 0 \end{pmatrix}$ | ~907 |
| TILE COORDINATE TRANSFORMATION MATRIX[1, 1] | $\begin{pmatrix} 1.5 & 0 \\ 0 & 2 \\ 0 & 0 \end{pmatrix}$ | ~908 |
| CARRY INTERVAL | (2, 4) | ~909 |

FIG. 12A

| ITEM | VALUE |
|---|---|
| 1200 — TILE ORIGIN | (x, y) |
| 1201 — TILE RANGE | (width, height) |
| 1202 — TILE COORDINATE TRANSFORMATION MATRIX | $\begin{pmatrix} 0 & b \\ c & 0 \\ 0 & 0 \end{pmatrix}$ |

FIG. 12B

| ITEM | VALUE |
|---|---|
| 1203 — TILE ORIGIN | (x, y) |
| 1204 — TILE RANGE | (width, height) |
| 1205 — TILE COORDINATE TRANSFORMATION MATRIX [i, j] | $\begin{pmatrix} 0 & b[i,j] \\ c[i,j] & 0 \\ 0 & 0 \end{pmatrix}$ |
| 1206 — CARRY INTERVAL | (lw, lh) |

FIG. 13A

| ITEM | VALUE |
|---|---|
| 1300 — TILE ORIGIN | (x, y) |
| 1301 — TILE RANGE | (width, height) |
| 1302 — TILE COORDINATE TRANSFORMATION MATRIX | $\begin{pmatrix} a & b \\ c & d \\ 0 & 0 \end{pmatrix}$ |

FIG. 13B

| ITEM | VALUE |
|---|---|
| 1303 — TILE ORIGIN | (x, y) |
| 1304 — TILE RANGE | (width, height) |
| 1305 — TILE COORDINATE TRANSFORMATION MATRIX[i, j] | $\begin{pmatrix} a & b \\ c & d \\ 0 & 0 \end{pmatrix} \begin{pmatrix} u[i,j] & 0 \\ 0 & v[i,j] \\ 0 & 0 \end{pmatrix}$ — 1307 |
| 1306 — CARRY INTERVAL | (lw, lh) |

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium.

Description of the Related Art

Conventionally, as one of the techniques for rendering a raster image, a tile drawing technique for repeatedly drawing in a tiled manner one or more objects specified as drawing targets to generate a raster image has been known. As an example, in Open XML Paper Specification (OpenXPS) discussed in TC46: "Open XML Paper Specification", Standard ECMA-388, June 2009, tile drawing can be specified as an attribute of a drawing target object. Further, Japanese Patent Application Laid-Open No. 2013-161509 discusses a technique for generating, based on the paths of one or more objects specified as tile drawing targets, one or more bitmapped tile images scaled to the resolution of a raster image and arranging the generated tile images.

Incidentally, the following method may also be possible. Instead of arranging rasterized bitmapped tile images as in the technique discussed in Japanese Patent Application Laid-Open No. 2013-161509, this method places the paths of objects as tile drawing targets for respective tiles and generates a raster image from the paths of the objects placed for the respective tiles. This method generates the edges of tiles from objects, places the edges of the respective tiles while shifting the edges, and at the position of each of the placed edges, draws a tile based on the path of the object corresponding to the edge. In this method, however, when the edges of the tiles are placed, the placement coordinates of the edges of the tiles may gradually shift in a width smaller than the coordinate width of each pixel unit at the resolution of a raster image. In this case, tile images obtained as the drawing results may result in an image in which the sizes of tiles are slightly different in places, or may result in an image in which a slight gap or a slight overlap occurs between tiles. An image of a drawing result in which the sizes of tiles are thus different in places, or a gap or an overlap thus occurs between tiles cannot be said to be an image excellent in appearance.

On the other hand, in the case of the above technique discussed in Japanese Patent Application Laid-Open No. 2013-161509, bitmapped tile images scaled to the resolution of a raster image are placed. Thus, a problem in the above method for placing the paths of objects to generate a raster image is unlikely to arise. In the case of the technique discussed in Japanese Patent Application Laid-Open No. 2013-161509, however, it is necessary to hold, during a rendering operation, a bitmap image having a large amount of data at the resolution of a raster image. This increases the amount of memory used to draw a raster image.

SUMMARY OF THE INVENTION

The present invention is directed to, when a raster image is drawn, capable of generating an image of an excellent drawing result without the need to hold a bitmap image having a large amount of data.

According to an aspect of the present invention, a method for generating a raster image according to a tile drawing command includes acquiring a tile drawing command for repeatedly rasterizing a specified object, determining whether an interval at which the object is repeated in a predetermined direction based on the acquired tile drawing command is an integer pixel width in a coordinate system of the raster image, generating, based on the acquired tile drawing command with which the interval is not the integer pixel width in the coordinate system according to the determination, another tile drawing command for repeatedly rasterizing the object in the predetermined direction in an interval of an integer pixel width in the coordinate system, wherein the generated another tile drawing command includes a plurality of pieces of information corresponding to a plurality of scaling factors in the predetermined direction for repeatedly rasterizing the object in the predetermined direction in the interval of the integer pixel width in the coordinate system, scaling, based on the another tile drawing command, the object to repeatedly rasterize the object in the predetermined direction.

Further features of the present invention will become apparent from the following description of exemplary embodiments with reference to the attached drawings.

BRIEF DESCRIPTION OF THE DRAWINGS

FIG. 3 is a table illustrating a format of parameters of a tile drawing command before a change.

FIG. 4 is a table illustrating specific examples of the parameters of the tile drawing command before the change.

FIGS. 5A and 5B are diagrams illustrating an example of tile drawing performed based on the tile drawing command before the change.

FIG. 8 is a table illustrating the format of the parameters of the tile drawing command after the change.

FIGS. 9A and 9B are tables illustrating examples of the parameters of the tile drawing command after the change.

FIGS. 12A and 12B are tables illustrating a format of parameters of a tile drawing command including a 90-degree rotation.

FIGS. 13A and 13B are tables illustrating a format of parameters of a tile drawing command including any rotation.

DESCRIPTION OF THE EMBODIMENTS

Exemplary embodiments of the present invention will be described in detail below with reference to the attached drawings.

Figure 1:
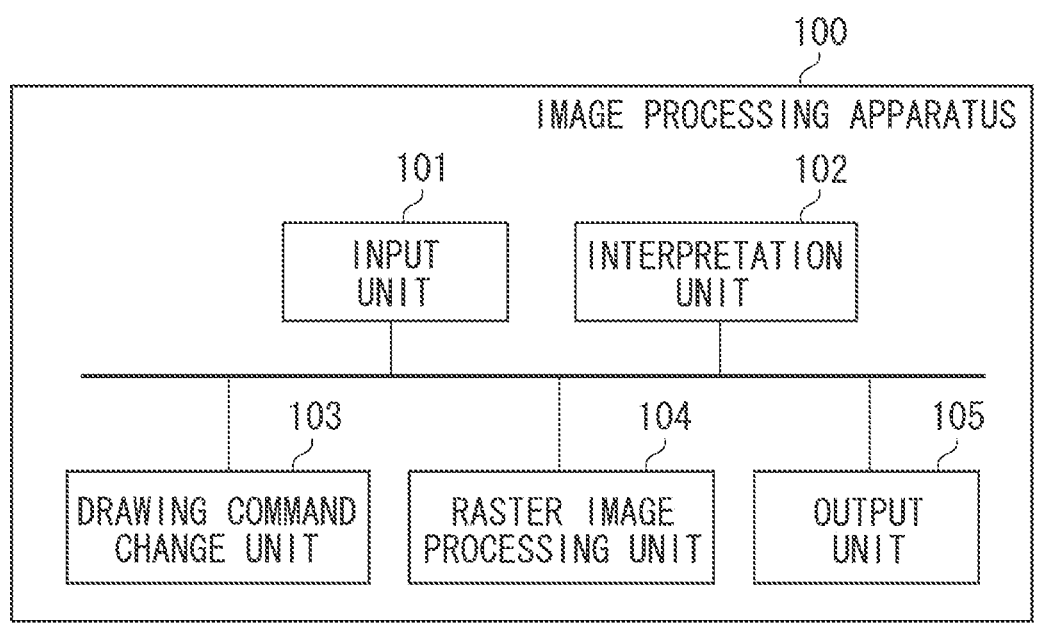
FIG. 1 is a block diagram illustrating an example of a general configuration of an image processing apparatus according to an exemplary embodiment.

FIG. 1 is a block diagram illustrating an example of a general configuration of an image processing apparatus 100 according to a first exemplary embodiment. Further, FIG. 2 is a block diagram illustrating data flow of the image processing apparatus 100.

Figure 2:
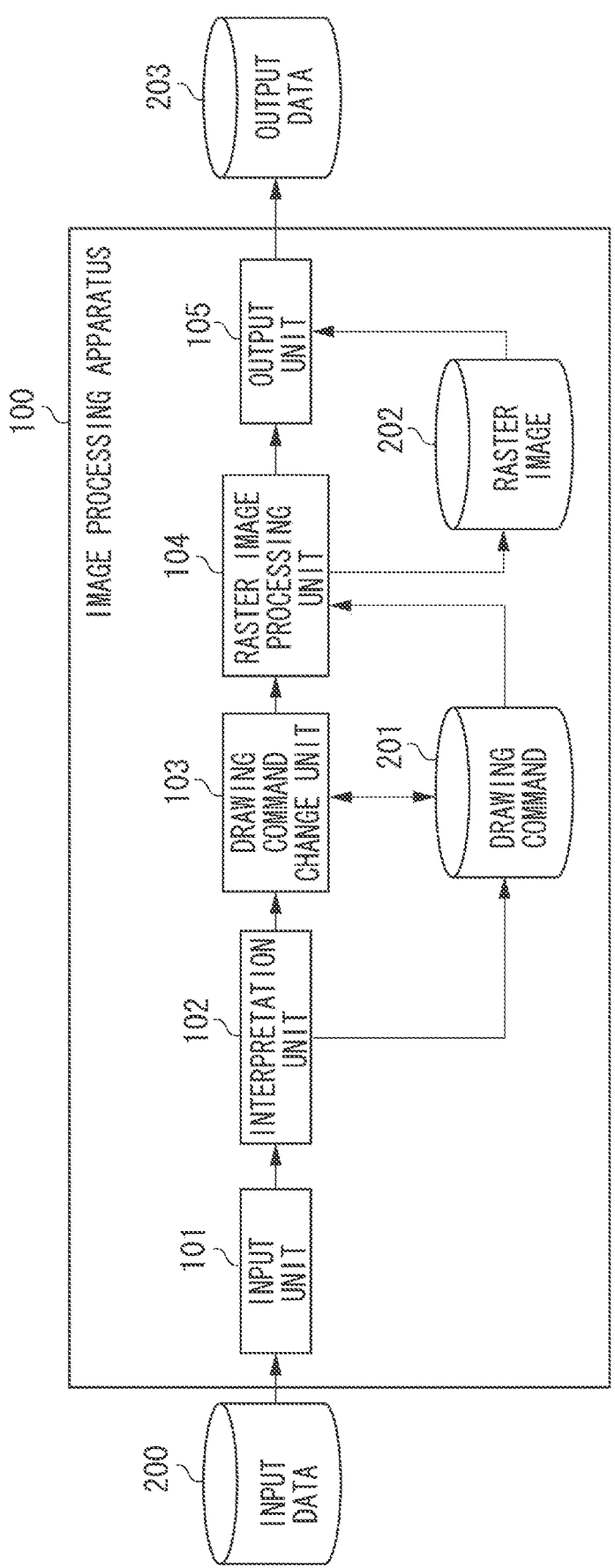
FIG. 2 is a block diagram illustrating a data flow of the image processing apparatus according to an exemplary embodiment.

In FIGS. 1 and 2, an input unit 101 receives input data 200 from an external apparatus connected to the image processing apparatus 100. An interpretation unit 102 interprets the input data 200 received by the input unit 101, thereby extracting a drawing command 201. In the case of the present exemplary embodiment, the input unit 101 and the interpretation unit 102 are examples of an acquisition unit and acquire from the input data 200 a tile drawing command in a vector format for repeatedly rasterizing in a tiled manner one or more objects specified as tile drawing targets to generate a raster image. The input data 200 according to the present exemplary embodiment is described in, for example, page description language (PDL). A suitable format of the input data 200 is OpenXPS, for example, and the drawing command 201 is an object of this OpenXPS.

A drawing command change unit 103 is an example of a control unit and a change unit, and changes the drawing command 201 extracted by the interpretation unit 102, if needed. The details of the drawing command change process performed by the drawing command change unit 103 will be described below.

In the following description, the drawing command 201 extracted from the input data 200 by the interpretation unit 102, i.e., a drawing command input to the drawing command change unit 103, is particularly referred to as an "input drawing command". Further, also in a case where the drawing command change unit 103 does not need to perform the drawing command change process, and a drawing command extracted from the input data 200 by the interpretation unit 102 is output as it is without being changed by the drawing command change unit 103, the drawing command is also referred to as an "input drawing command". On the other hand, in the present exemplary embodiment, a drawing command extracted from the input data 200 by the interpretation unit 102 and changed by the drawing command change unit 103 is particularly referred to as a "changed drawing command". The same number is used as reference numbers for an input drawing command and a changed drawing command.

Based on a changed drawing command after being changed by the drawing command change unit 103 or an input drawing command that has not been changed by the drawing command change unit 103, the raster image processing unit 104 generates a raster image 202. An output unit 105 performs image processing such as a halftone process on the raster image 202 generated by the raster image processing unit 104 to generate output data 203, and outputs the generated output data 203.

The image processing apparatus 100 according to the first exemplary embodiment is, for example, a multifunction printer (MFP). The output unit 105 performs printing on a recording sheet, thereby outputting the output data 203. The input unit 101, the interpretation unit 102, the drawing command change unit 103, the raster image processing unit 104, and the output unit 105 are realized by a central processing unit (CPU) loading various programs corresponding to the functions of the respective units into a random-access memory (RAM), and executing the various programs. Alternatively, the raster image processing unit 104 may be realized not by the CPU but by an application-specific integrated circuit (ASIC) for generating a raster image. Alternatively, the image processing apparatus 100 may be realized by a computer. Alternatively, the image processing apparatus 100 may output data to a display apparatus.

The image processing apparatus 100 according to the present exemplary embodiment employs a technique in which, when drawing tiles, the paths of objects as tile drawing targets are placed for respective tiles and a raster image is generated based on the paths of the objects placed for the respective tiles. The path of each object corresponds to a vector representing the outline of the object. As described above, in this technique, the edges of tiles are generated from objects, the edges of the respective tiles are placed while shifting the edges, and at the position of each of the placed edges, a tile is drawn based on the path of the object corresponding to the edge. The image processing apparatus 100 according to the present exemplary embodiment, however, can change the input drawing command 201 so that the placement coordinates and the size of each edge become integers in the coordinate system of a raster image. More specifically, the drawing command change unit 103 determines whether, in a case where it is assumed that an object is subjected to tile drawing based on an acquired tile drawing command, the widths in an x-axis direction and a y-axis direction of a tile in the coordinate system of a raster image are integer widths. Then, if the widths in the x-axis direction and the y-axis direction of the tile are not integer widths, the drawing command change unit 103 changes the tile drawing command to such a drawing command that the widths in the x-axis direction and the y-axis direction of the tile are integer widths when the object is drawn.

FIG. 3 is a table illustrating an example of a format of parameters of a tile drawing command included in the input drawing command 201 extracted from the input data 200 by the interpretation unit 102.

In the tile drawing command illustrated in FIG. 3, "x" and "y" of a tile origin 300 are an x-coordinate and a y-coordinate of start coordinates of tile drawing, respectively, represented in the coordinate system of the input data 200 (hereinafter, referred to as an "input coordinate system"). "Width" and "height" of a tile range 301 are a coordinate width in an x-axis direction (hereinafter, referred to as a "horizontal width") in which tile drawing is to be performed, and a coordinate width in a y-axis direction (hereinafter, referred to as a "vertical width"), respectively, the coordinate widths represented in the input coordinate system. Then, the coordinates of the tile origin 300 and the tile range 301 in the coordinate system of the raster image 202 (hereinafter, referred to as a "device coordinate system") are obtained by coordinate transformation from the input data 200 to the raster image 202. For example, in a case where the unit of coordinates of the input data 200 is 1/96 inches, and the raster image 202 at 600 dpi that does not include a rotation in tile drawing and a blank space is generated, the coordinates of the input data 200 are multiplied by 600/96. In FIGS. 4, 5A, and 5B, an example is illustrated in which the unit of coordinates of the input data 200 is 1/96 inches, and the raster image 202 at 192 dpi that does not include a rotation in tile drawing and a blank space is generated, i.e., the coordinates of the input data 200 are multiplied by 192/96=2.

In FIG. 3, a tile coordinate transformation matrix 302 is a coordinate transformation matrix used to transform one or more objects specified as tile drawing targets from the input coordinate system to the coordinate system of the raster image 202 (the device coordinate system). The tile coordinate transformation matrix 302 is a so-called affine transformation matrix, and an a-element of the matrix represents a scaling factor in the x-direction, and a d-element of the matrix represents a scaling factor in the y-direction. Further, in the example of the tile coordinate transformation matrix 302 in FIG. 3, all the elements except for the a-element and the d-element are "0". In other words, in the example illustrated in FIG. 3, the tile drawing command includes the tile coordinate transformation matrix 302 of a case where tile drawing does not include a rotation and a movement.

With reference to FIGS. 4, 5A, and 5B, taking specific examples of the parameters of a tile drawing command, a description is given below of an example where the raster image processing unit 104 performs tile drawing by rendering based on the tile drawing command. FIG. 4 is a diagram illustrating a specific example of the parameters of the tile drawing command illustrated in FIG. 3, which is included in the input drawing command 201. In the example in FIG. 4, the coordinates of a tile origin 400 are (1, 2), a tile range 401 is (6, 3), an a-element of a tile coordinate transformation matrix 402 is 1.5, and a d-element of the tile coordinate transformation matrix 402 is 1.5.

FIG. 5A illustrates an example of an object specified as a tile drawing target. The shape of the object illustrated in FIG. 5A is a right-angled isosceles triangle. Further, it is assumed that in the object in FIG. 5A, each of the two equal sides sharing the apex of the right-angled isosceles triangle is specified as having a length of 2 pixels, one of the equal sides is specified as being in the x-axis direction of the input coordinate system, and the other equal side is specified as being in the y-axis direction of the input coordinate system. Then, it is assumed that tile drawing is started from the apex of the right-angled isosceles triangle.

FIG. 5B is a diagram illustrating an example of the drawing result in a case where the raster image processing unit 104 renders the object in FIG. 5A based on the parameters in FIG. 4. In FIG. 5B, a grid represents the boundaries between pixels in the raster image 202. In FIG. 5B, numbers in an x-axis direction represent x-coordinate values in pixel units in the device coordinate system where the origin is the upper left in FIG. 5B, and numbers in a y-axis direction represent y-coordinate values in pixel units. Further, in the example in FIG. 5B, a pixel in which a dot pattern is drawn represents a pixel included in a tile drawn by rendering the object. The determination of whether each pixel in the raster image 202 is a pixel included in a tile is made based on whether the object as a tile drawing target overlaps the center point of the pixel in the raster image 202. If the object overlaps the center point of a pixel in the raster image 202, it is determined that the pixel is a pixel included in a tile.

Further, in FIGS. 4, 5A, and 5B, in the transformation from the input coordinate system of the input data 200 to the device coordinate system of the raster image 202, coordinates are scaled twice both in the x-direction and the y-direction as an example. For example, this corresponds to a case where the unit of coordinates of the input data 200 is 1/96 inches, and the raster image 202 at 192 dpi that does not include a rotation in tile drawing and a blank space is generated.

A description is given below of the details of the state of rendering when the raster image processing unit 104 performs tile drawing as in FIG. 5B on the object in FIG. 5A. As described above, in FIG. 4, the tile origin 400 has coordinate (1, 2) in the input coordinate system. In the present exemplary embodiment, in the coordinate transformation from the input coordinate system to the device coordinate system, coordinates are scaled twice both in the x-direction and the y-direction. Thus, coordinate (1, 2) of the tile origin 400 in the input coordinate system is transformed to coordinate (2, 4) in the device coordinate system. Thus, drawing start coordinates in the device coordinate system when the object in FIG. 5A is subjected to tile drawing are coordinate (2, 4) in the device coordinate system as illustrated in FIG. 5B.

On the other hand, in the case of the tile coordinate transformation matrix 402 in FIG. 4, as described above, the a-element is 1.5, and the d-element is 1.5. Thus, the scaling factors in the x-direction and the y-direction are 1.5 times. Further, as described above, the object in FIG. 5A is an object of a right-angled isosceles triangle in which each of the lengths of the two equal sides is 2 pixels. One of the equal sides is specified as being in the x-axis direction of the input coordinate system, and the other equal side is specified as being in the y-axis direction. Therefore, the object of an right-angled isosceles triangle illustrated in FIG. 5A is drawn based on the tile coordinate transformation matrix 402 in FIG. 4, as a tile of a right-angled isosceles triangle where each of the lengths in the x-axis direction and the y-axis direction of the equal sides is 3 pixels in the device coordinate system in FIG. 5B. For example, to give a description taking only a single tile drawn from the start coordinate (2, 4) in the device coordinate system in FIG. 5B, a tile is drawn in six pixels at coordinates (2, 4), (3, 4), (4, 4), (2, 5), (3, 5), and (2, 6) in the device coordinate system. In the following description, the size of the object in FIG. 5A specified as a tile drawing target to be subjected to tile drawing as in FIG. 5B is referred to as a "tile size". As described referring to FIGS. 4, 5A, and 5B, the tile size is a size obtained by multiplying the size of the object in the input coordinate system by the scaling factors represented by the a-element and the d-element of the tile coordinate transformation matrix 402.

Then, in FIG. 4, the tile range 401 is specified as (6, 3) in the input coordinate system, and (6, 3) is scaled twice (i.e., transformed to (12, 6)). Thus, in the device coordinate system, as in FIG. 5B, tile drawing is repeated in the range of 12 pixels in the x-axis direction (the horizontal direction) and 6 pixels in the y-axis direction (the vertical direction) from the start coordinate (2, 4). In the examples in FIGS. 4, 5A, and 5B, as an example, tile drawing corresponding to a single object is repeated. Alternatively, also in a case where a plurality of objects are subjected to tile drawing, a tile drawing process similar to the above is performed on each object.

In the example in FIGS. 4, 5A, and 5B, when the object is subjected to tile drawing based on the tile drawing command, the widths in the x-axis direction and the y-axis direction of a tile in the device coordinate system of a raster image are integer widths. In such a case, it is considered that the drawing command change unit 103 does not need to execute the input drawing command 201. On the other hand, if the widths in the x-axis direction and the y-axis direction of a tile are not integer widths, the drawing command change unit 103 changes the tile drawing command in the input drawing command 201 to a drawing command by which the widths in the x-axis direction and the y-axis direction of a tile are integer widths when the object is drawn.

Figure 6:
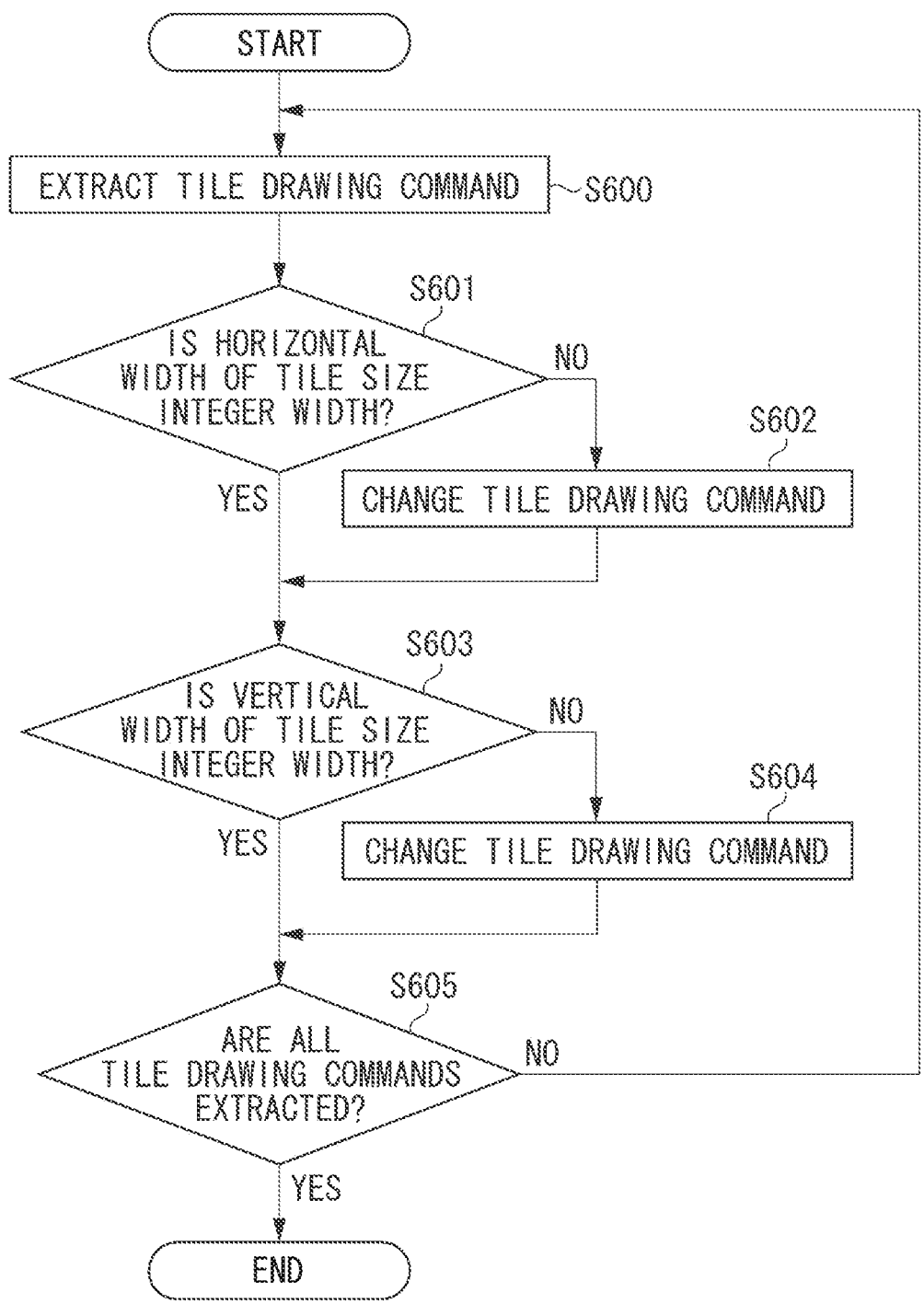
FIG. 6 is a flowchart illustrating a procedure for changing a tile drawing command.

FIG. 6 is a flowchart illustrating a procedure in a case where the drawing command change unit 103 determines whether the widths in the x-axis direction and the y-axis direction of a tile are integer widths, and according to the determination result, the drawing command change unit 103 changes or does not change a drawing command.

In the flowchart in FIG. 6, first, in step S600, the drawing command change unit 103 extracts a tile drawing command from the input drawing command 201. Then, the processing proceeds to step S601.

In step S601, the drawing command change unit 103 determines whether the width in the x-axis direction of the tile size (hereinafter, referred to as "the horizontal width of the tile size") is an integer width in the device coordinate system. More specifically, the drawing command change unit 103 determines whether, in a case where it is assumed that the raster image processing unit 104 performs drawing based on the input drawing command 201, the horizontal width of the tile size is an integer width in the device coordinate system. If it is determined in step S601 that the horizontal width of the tile size is an integer width (YES in step S601), the processing proceeds to step S603. If, on the other hand, it is determined that the horizontal width of the tile size is not an integer width (NO in step S601), the processing proceeds to step S602. In step S602, the drawing command change unit 103 performs the process of changing the tile drawing command with respect to the input drawing command 201. The details of the process of changing the tile drawing command in step S602 will be described below. After step S602, the processing proceeds to step S603.

In step S603, the drawing command change unit 103 determines whether the width in the y-axis direction of the tile size (hereinafter, referred to as "the vertical width of the tile size") is an integer width in the device coordinate system. More specifically, the drawing command change unit 103 determines whether, in a case where it is assumed that the raster image processing unit 104 performs drawing based on the input drawing command 201, the vertical width of the tile size is an integer width in the device coordinate system. If it is determined in step S603 that the horizontal width of the tile size is an integer width (YES in step S603), the processing proceeds to step S605. If, on the other hand, it is determined that the horizontal width of the tile size is not an integer width (NO in step S603), the processing proceeds to step S604. In step S604, the drawing command change unit 103 performs the process of changing the tile drawing command with respect to the input drawing command 201. The details of the process of changing the tile drawing command in step S604 will be described below. After step S604, the processing proceeds to step S605.

In step S605, the drawing command change unit 103 determines whether all tile drawing commands in the input drawing command 201 are extracted. If it is determined in step S605 that not all the tile drawing commands are extracted (NO in step S605), the processing returns to step S600. If, on the other hand, it is determined that all the tile drawing commands are extracted (YES in step S605), the processing in FIG. 6 ends.

Figure 7A:
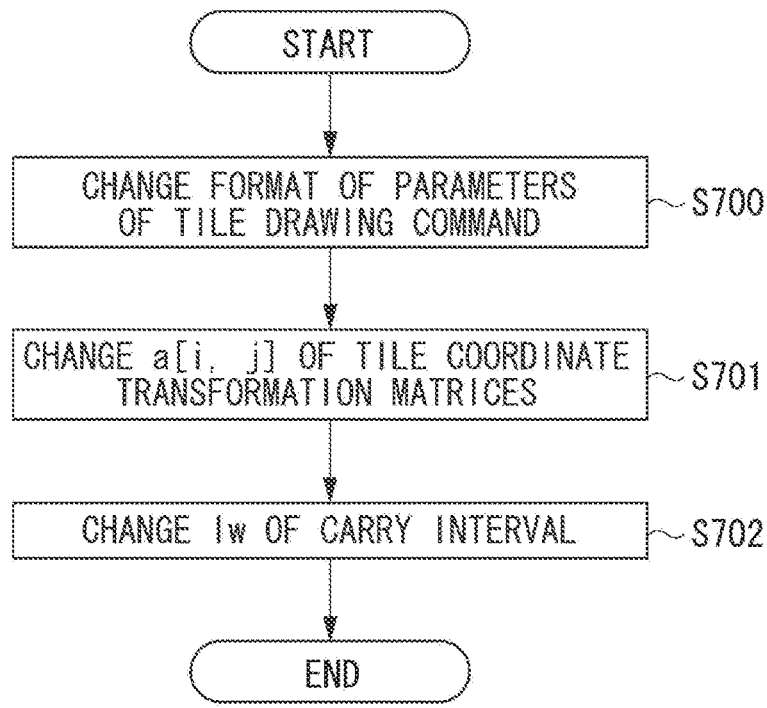
FIGS. 7A and 7B are flowcharts for a change in a case where a width of a tile size is not an integer width.
Figure 7B:
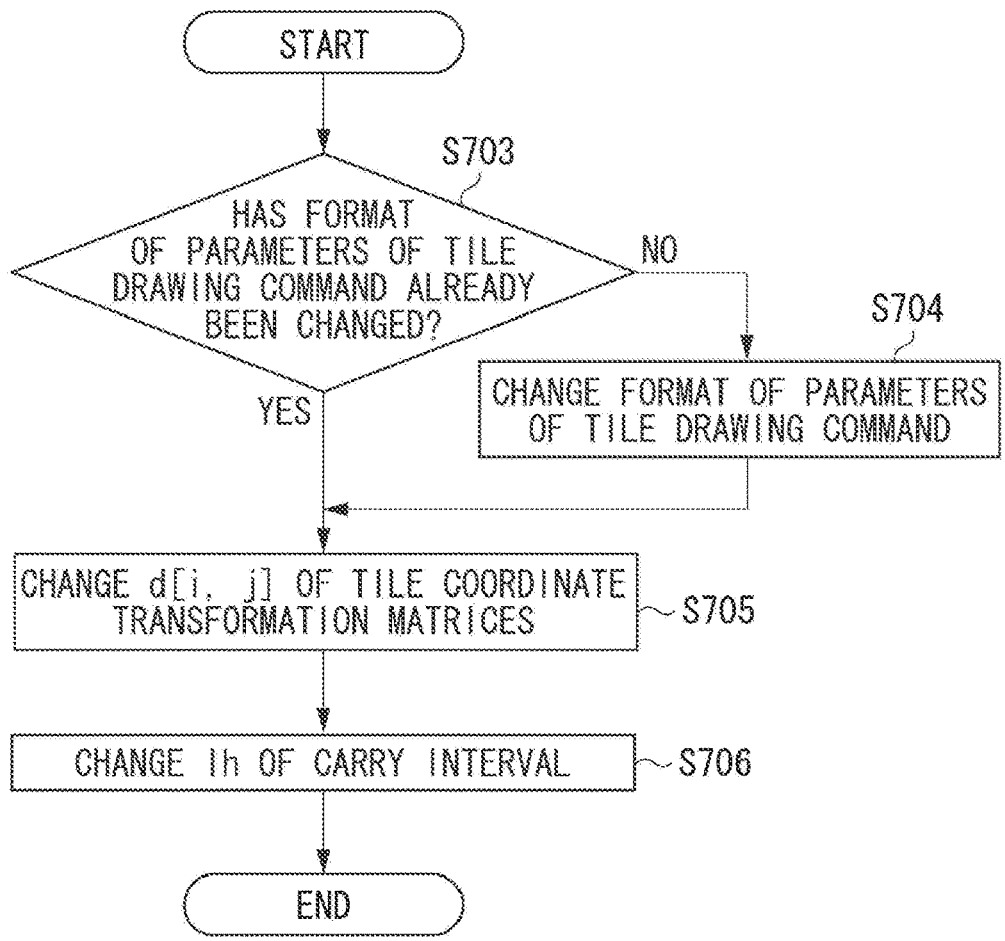

FIG. 7A is a flowchart illustrating a procedure for changing the tile drawing command, which is executed by the drawing command change unit 103 in step S602 in FIG. 6 in a case where the horizontal width of the tile size is not an integer width in the device coordinate system. Further, FIG. 7B is a flowchart illustrating a procedure for changing the tile drawing command, which is executed by the drawing command change unit 103 in step S604 in FIG. 6 in a case where the vertical width of the tile size is not an integer width in the device coordinate system.

Further, FIG. 8 is a diagram illustrating an example of a parameter format of the tile drawing command after the drawing command change unit 103 performs the process of changing the tile drawing command. In the case of the parameters in FIG. 8, a tile coordinate transformation matrix 802 has a two-dimensional array similar to that of the tile coordinate transformation matrix 302 in FIG. 3. However, "i" and "j" of a tile coordinate transformation matrix [i, j] can take a value of "0" or "1". Thus, the tile coordinate transformation matrix 802 includes four tile coordinate transformation matrices [0, 0], [0, 1], [1, 0], and [1, 1]. Thus, in the tile coordinate transformation matrix [0, 0], a[i, j] is a[0, 0], and d[i, j] is d[0, 0]. Similarly, in the tile coordinate transformation matrix [0, 1], a[i, j] is a[0, 1], and d[i, j] is d[0, 1]. In the tile coordinate transformation matrix [1, 0], a[i, j] is a[1, 0], and d[i, j] is d[1, 0]. In the tile coordinate transformation matrix [1, 1], a[i, j] is a[1, 1], and d[i, j] is d[1, 1]. Further, in the parameters in FIG. 8 after the drawing command change unit 103 performs the process of changing the tile drawing command, a carry interval 803 is set.

First, the flowchart of the tile drawing command change procedure in FIG. 7A is described. In the flowchart in FIG. 7A, first, in step S700, the drawing command change unit 103 changes the format of the parameters of the tile drawing command illustrated in FIG. 3 to the format of the parameters of the tile drawing command as illustrated in FIG. 8. At this time, the drawing command change unit 103 uses, as the initial values of a tile origin 800 in the format of the parameters of the tile drawing command illustrated in FIG. 8, the same values as those of the tile origin 300 in the drawing command 201 before the change, which is illustrated in FIG. 3. Similarly, the drawing command change unit 103 uses, as the initial values of a tile range 801, the same values as those of the tile range 301 in FIG. 3. Further, the drawing command change unit 103 uses, as the initial values of the tile coordinate transformation matrix 802, the same values as those of the tile coordinate transformation matrix 302 in FIG. 3 for the a-elements and the d-elements of the above four tile coordinate transformation matrices [0, 0] to [1, 1]. Further, the drawing command change unit 103 sets (0, 0) as the initial values of (Iw, Ih) of the carry interval 803 in FIG. 8. The details of the carry interval 803 will be described below. After step S700, the processing proceeds to step S701.

In step S701, the drawing command change unit 103 changes the a-elements of the four tile coordinate transformation matrices 802 of which the initial values are set as described above. More specifically, in the four tile coordinate transformation matrices 802, the drawing command change unit 103 changes a[0, 0] of the tile coordinate transformation matrix [0, 0] and a[0, 1] of the tile coordinate transformation matrix [0, 1], in which "i" is "0", to values obtained by a division calculation of formula (1). Further, in the four tile coordinate transformation matrices 802, the drawing command change unit 103 changes a[1, 0] of the tile coordinate transformation matrix [1, 0] and a[1, 1] of the tile coordinate transformation matrix [1, 1], in which "i" is "1", to values obtained by a division calculation of formula (2).

$$\{\text{floor(the horizontal width of the tile size)} \div \text{the horizontal width of the object in the input coordinate system}\} \quad \text{formula (1)}$$

$$\{\text{ceil(the horizontal width of the tile size)} \div \text{the horizontal width of the object in the input coordinate system}\} \quad \text{formula (2)}$$

A floor(n) represents the rounding down of the decimal of a value n. A ceil(n) represents the rounding up of the decimal of the value n. After step S701, the processing proceeds to step S702.

In step S702, the drawing command change unit 103 changes, in (Iw, Ih) of the carry interval 803, Iw to a value obtained by formula (3).

$$\{\text{ceil}(1 \div \text{the decimal part of the horizontal width of the tile size})\} \quad \text{formula (3)}$$

If the process in step S702 is finished, the processing in FIG. 7A ends. Then, the processing proceeds to step S603 in FIG. 6.

Next, the flowchart of the tile drawing command change procedure in FIG. 7B is described. In the flowchart in FIG. 7B, first, in step S703, the drawing command change unit 103 determines whether the format of the parameters of the tile drawing command has already been changed. If it is determined in step S703 that the format of the parameters of the tile drawing command has already been changed (YES in step S703), the processing proceeds to step S705. If, on the other hand, it is determined that the format of the parameters of the tile drawing command has not yet been changed (NO in step S703), the processing proceeds to step S704.

In step S704, the drawing command change unit 103 changes the format of the parameters of the drawing command by a procedure similar to that in step S700 in FIG. 7A. After step S704, the processing proceeds to step S705.

In step S705, the drawing command change unit 103 changes the d-elements of the four tile coordinate transformation matrices 802 of which the initial values are set as described above. More specifically, in the four tile coordinate transformation matrices 802, the drawing command change unit 103 changes d[0, 0] of the tile coordinate transformation matrix [0, 0] and d[1, 0] of the tile coordinate transformation matrix [1, 0], in which "j" is "0", to values obtained by a division calculation of formula (4). Further, in the four tile coordinate transformation matrices 802, the drawing command change unit 103 changes d[0, 1] of the tile coordinate transformation matrix [0, 1] and d[1, 1] of the tile coordinate transformation matrix [1, 1], in which "j" is "1", to values obtained by a division calculation of formula (5).

$$\{\text{floor}(\text{the vertical width of the tile size}) \div \text{the vertical width of the object in the input coordinate system}\} \quad \text{formula (4)}$$

$$\{\text{ceil}(\text{the vertical width of the tile size}) \div \text{the vertical width of the object in the input coordinate system}\} \quad \text{formula (5)}$$

A floor(n) and a ceil(n) are similar to those described in FIG. 7A. After step S705, the processing proceeds to step S706.

In step S706, the drawing command change unit 103 changes, in (Iw, Ih) of the carry interval 803, Ih to a value obtained by formula (6).

$$\{\text{ceil}(1 \div \text{the decimal part of the vertical width of the tile size})\} \quad \text{formula (6)}$$

If the process in step S706 is finished, the processing in FIG. 7B ends. Then, the processing proceeds to step S605 in FIG. 6.

FIGS. 9A and 9B are diagrams illustrating examples of, in a case where the format of the parameters of the tile drawing command is changed in the flowcharts in FIGS. 7A and 7B, the parameter format of the tile drawing command before the change and the parameter format of the tile drawing command after the change. FIG. 9A illustrates a specific example of the format of the parameters of the tile drawing command before the change in FIG. 3. FIG. 9B illustrates a specific example of the format of the parameters of the tile drawing command after the change in FIG. 8.

Figure 11A:
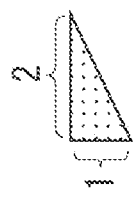
FIGS. 11A and 11B are diagrams illustrating an example of tile drawing performed based on a tile drawing command after a change.

In the case of the examples of FIGS. 9A and 9B, it is assumed that an object specified as a tile drawing target is an object of a right-angled triangle as illustrated in FIG. 11A. More specifically, it is assumed that in the object, the length of one side including the right-angled apex of the right-angled triangle is 2 pixels in the x-axis direction of the input coordinate system, and the length of the other side is 1 pixel in the y-axis direction. Then, it is assumed that tile drawing is started from the right-angled apex of the right-angled triangle. Further, in the example of FIG. 9A, it is assumed that the coordinates of a tile origin 900 are (1, 2), a tile range 901 is (7, 3.5), an a-element of a tile coordinate transformation matrix 902 is 1.25, and a d-element of the tile coordinate transformation matrix 902 is 1.25. Thus, in the case of the example of FIG. 9A, the horizontal width of the tile size is "2.5" pixels, which is obtained by multiplying "2", which is the horizontal width of the object, by "1.25", which is the a-element of the tile coordinate transformation matrix 902. Similarly, the vertical width of the tile size is "1.25" pixels, which is obtained by multiplying "1", which is the vertical width of the object, by "1.25", which is the d-element of the tile coordinate transformation matrix 902.

As described above, in the case of the tile drawing command illustrated in FIG. 9A, the numbers of pixels in the x-axis direction and the y-axis direction of the tile size are "2.5" pixels and "1.25" pixels, respectively. Thus, in the case of the tile drawing command in FIG. 9A, the horizontal width and the vertical width of the tile size are not integer widths in the device coordinate system. Therefore, the drawing command change unit 103 changes the format of the parameters of the tile drawing command to the format as illustrated in FIG. 9B.

A specific description is given below of an example in which the drawing command change unit 103 changes the format of the parameters of the tile drawing command in FIG. 9A to the parameter format of the tile drawing command in FIG. 9B. When the parameter format of the tile drawing command is changed, as described above, the values of the tile origin 900 and the tile range 901 before the change are used as they are as the initial values of a tile origin 903 and a tile range 904, respectively, after the change. Therefore, the values of the tile origin 903 in FIG. 9B are (1, 2), which are the values of the tile origin 900 in FIG. 9A. Similarly, the values of the tile range 904 in FIG. 9B are (7, 3.5), which are the values of the tile range 901 in FIG. 9A.

On the other hand, the tile coordinate transformation matrix 902 in FIG. 9A is transformed into four tile coordinate transformation matrices 905 to 908 (tile coordinate transformation matrices [0, 0] to [1, 1]) illustrated in FIG. 9B, using the above formulas (1), (2), (4), and (5).

More specifically, an a-element of the tile coordinate transformation matrix [0, 0] and an a-element of the tile coordinate transformation matrix [0, 1] are changed to a value of floor(2.5)÷2=2÷2=1 by formula (1). Similarly, an a-element of the tile coordinate transformation matrix [1, 0] and an a-element of the tile coordinate transformation matrix [1, 1] are changed to a value of ceil(2.5)÷2=3÷2=1.5 by formula (2). A d-element of the tile coordinate transformation matrix [0, 0] and a d-element of the tile coordinate transformation matrix [1, 0] are changed to a value of floor(1.25)÷1=1÷1=1 by formula (4). A d-element of the tile coordinate transformation matrix [1, 0] and a d-element of the tile coordinate transformation matrix [1, 1] are changed to a value of ceil(1.25)÷1=2÷1=2 by formula (5).

Consequently, the tile coordinate transformation matrix 905 in FIG. 9B is a matrix in which an a-element is "1", and a d-element is "1". The tile coordinate transformation matrix 906 is a matrix in which an a-element is "1", and a d-element is "2". Further, the tile coordinate transformation matrix 907 is a matrix in which an a-element is "1.5", and a d-element is "1". The tile coordinate transformation matrix 908 is a matrix in which an a-element is "1.5", and a d-element is "2". In the present exemplary embodiment, the tile coordinate transformation matrix 905 in FIG. 9B is an example of a first matrix, and the tile coordinate transformation matrix 906 is an example of a second matrix. Further, the tile coordinate transformation matrix 907 is an example of a third matrix, and the tile coordinate transformation matrix 908 is an example of a fourth matrix.

Further, a carry interval 909 is obtained by calculations of the above formulas (3) and (6). More specifically, Iw of the carry interval 909 is a value of ceil(1÷0.5)=2 by formula (3). Ih of the carry interval 909 is a value of ceil(1÷0.25)=4 by formula (6). Thus, the carry interval 909 in FIG. 9B is (2, 4).

The drawing command change unit 103 changes the tile drawing command in FIG. 9A to the tile drawing command in FIG. 9B as described above.

Then, in the present exemplary embodiment, in a case where the tile drawing command is not changed by the drawing command change unit 103, the raster image processing unit 104 performs a tile drawing process based on the tile drawing command illustrated in FIG. 3 in the input drawing command 201. On the other hand, in a case where the tile drawing command is changed by the drawing command change unit 103, the raster image processing unit 104 selects the changed drawing command 201 (the tile drawing command in FIG. 8). Further, as will be described below, based on the carry interval 803, the raster image processing unit 104 selects, for each tile, any one tile coordinate transformation matrix 802 from among the four tile coordinate transformation matrices 802 in the tile drawing command that has already been changed, and then performs a drawing process on the tile.

Figure 10:
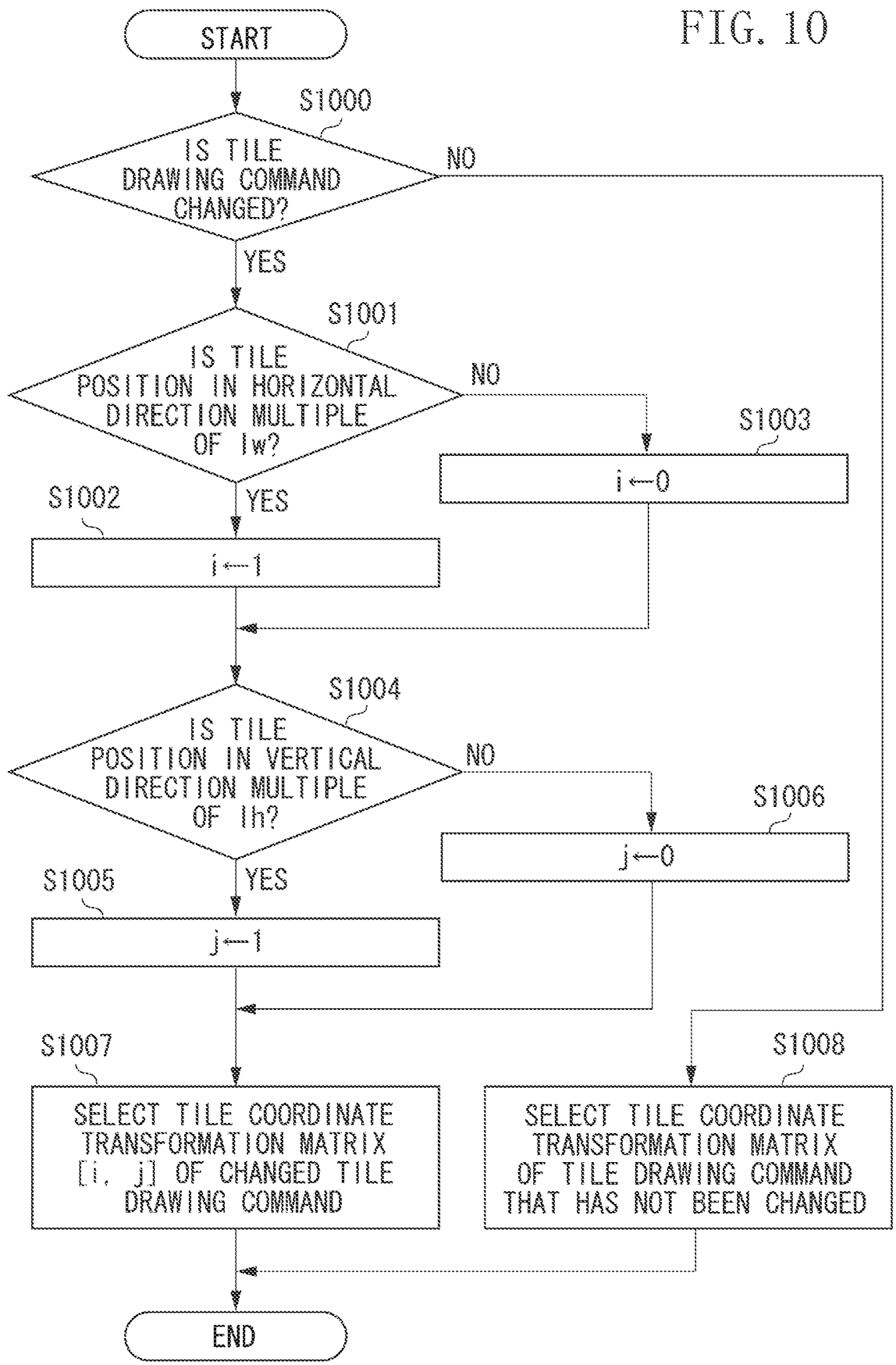
FIG. 10 is a flowchart when one of tile coordinate transformation matrices is selected.

FIG. 10 is a flowchart illustrating a procedure in a case where the raster image processing unit 104 selects the input drawing command 201 or the changed drawing command 201 when rendering each tile, and if the changed drawing command 201 is selected, the raster image processing unit 104 further selects a tile coordinate transformation matrix.

In the flowchart illustrated in FIG. 10, first, in step S1000, the raster image processing unit 104 determines whether the tile drawing command in the input drawing command 201 is changed by the drawing command change unit 103. If it is determined in step S1000 that the tile drawing command in the input drawing command 201 is changed (YES in step S1000), the processing proceeds to step S1001. If, on the other hand, it is determined that the tile drawing command in the input drawing command 201 is not changed (NO in step S1000), the processing proceeds to step S1008. In step S1008, the raster image processing unit 104 selects a tile coordinate transformation matrix (the tile coordinate transformation matrix 302 in FIG. 3) of the tile drawing command in the input drawing command 201. Then, the selection process in the flowchart in FIG. 10 ends.

In step S1001, the raster image processing unit 104 determines whether the number of the tile position in the x-axis direction (the horizontal direction) is a multiple of Iw of the carry interval 803. The tile position is a number indicating, in order, the position where each tile to be drawn is placed in each of the x-axis direction (the horizontal direction) and the y-axis direction (the vertical direction) of the device coordinate system. In the x-axis direction, the tile position of a tile at the left end of the tile range 801 is number one, and consecutive numbers in ascending order are assigned rightward. In the y-axis direction, the tile position of a tile at the upper end of the tile range 801 is number one, and consecutive numbers in ascending order are assigned downward. If it is determined in step S1001 that the number of the tile position in the x-axis direction is a multiple of Iw of the carry interval 803 (YES in step S1001), the processing proceeds to step S1002. If, on the other hand, it is determined that the number of the tile position in the x-axis direction is not a multiple of Iw of the carry interval 803 (NO in step S1001), the processing proceeds to step S1003.

In step S1002, the raster image processing unit 104 substitutes "1" for "i". Then, the processing proceeds to step S1004. On the other hand, in step S1003, the raster image processing unit 104 substitutes "0" for "i". Then, the processing proceeds to step S1004.

In step S1004, the raster image processing unit 104 determines whether the number of the tile position in the y-axis direction is a multiple of Ih of the carry interval 803. If it is determined in step S1004 that the number of the tile position in the y-axis direction is a multiple of Ih of the carry interval 803 (YES in step S1004), the processing proceeds to step S1005. If, on the other hand, it is determined that the number of the tile position in the y-axis direction is not a multiple of Ih of the carry interval 803 (NO in step S1004), the processing proceeds to step S1006.

In step S1005, the raster image processing unit 104 substitutes "1" for "j". Then, the processing proceeds to step S1007. On the other hand, in step S1006, the raster image processing unit 104 substitutes "0" for "j". Then, the processing proceeds to step S1007.

In step S1007, the raster image processing unit 104 selects from among the above four tile coordinate transformation matrices 802 a tile coordinate transformation matrix 802 according to [i, j] determined in step S1002 or S1003 and in step S1005 or S1006. As described above, in step S1002 or S1003 and in step S1005 or S1006, [i, j] is determined based on the tile position and the carry interval 803. Then, according to [i, j] determined based on the tile position and the carry interval 803, one tile coordinate transformation matrix 802 is selected from among the four tile coordinate transformation matrices 802.

Figure 11B:
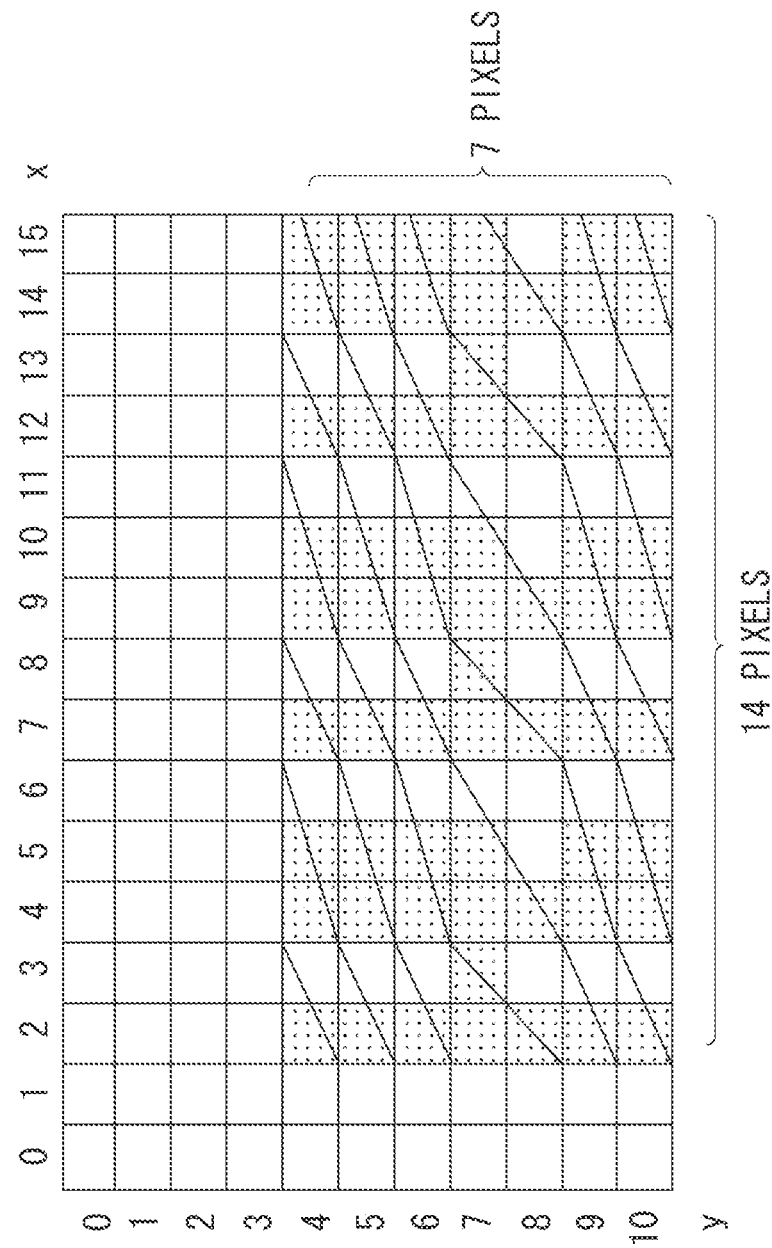

With reference to FIGS. 11A and 11B, taking the parameters of the tile drawing command in FIG. 9B as examples, a description is given below of a specific example where tile drawing is performed based on the tile drawing command. FIG. 11A illustrates an example of an object specified as a tile drawing target, and an object of a right-angled triangle used in the description of FIGS. 9A and 9B. Further, FIG. 11B is a diagram illustrating an example of the drawing result of the raster image processing unit 104 rendering tiles of the object in FIG. 9A using a tile coordinate transformation matrix selected at each tile position in FIG. 10 based on the carry interval 909 in FIG. 9B.

In FIG. 11B, similarly to FIG. 5B, a grid represents the boundaries between pixels in the raster image 202. In FIG. 11B, numbers in an x-axis direction and a y-axis direction represent x-coordinate values and y-coordinate values in the device coordinate system where the origin is the upper left in FIG. 11B. Further, also in the example of FIG. 11B, similarly to the examples of FIGS. 4 and 5B, in the coordinate transformation from the input data 200 to the raster image 202, coordinates are scaled twice both in the x-direction and the y-direction. Further, in FIG. 11B, similarly to FIG. 5B, a pixel in which a dot pattern is drawn represents a pixel included in a tile. Further, the determination of whether each pixel is a pixel included in a tile is made based on whether the object overlaps the center point of the pixel in the device coordinate system. In the case of FIG. 11B, for example, in pixels of which coordinates (x, y) are (3, 4), (6, 4), (5, 8), and (6, 7), the object does not overlap the center point of each pixel. Thus, a dot pattern is not drawn. On the other hand, for example, in pixels of which coordinates (x, y) are (2, 4), (4, 4), (5, 4), (4, 8), and (5, 7), the object overlaps the center point of each pixel. Thus, a dot pattern is drawn.

A description is given below of the details of the state of rendering when tile drawing as in FIG. 11B is performed on the object in FIG. 11A based on the tile drawing command in FIG. 9B. As described above, in FIG. 9B, the tile origin 903 has coordinate (1, 2) in the input coordinate system. In the coordinate transformation from the input coordinate system to the device coordinate system, coordinates are scaled twice both in the x-direction and the y-direction. Therefore, coordinate (1, 2) of the tile origin 903 in the input coordinate system is transformed to coordinate (2, 4) in the device coordinate system. As a result, drawing start coordinates in the device coordinate system when the object in FIG. 11A is subjected to tile drawing are coordinate (2, 4) in the device coordinate system as illustrated in FIG. 11B.

Further, in FIG. 9B, the tile range 904 is (7, 3.5) in the input coordinate system, and (7, 3.5) is scaled twice (i.e., transformed to (14, 7)). Therefore, in the device coordinate system, as in FIG. 11B, tile drawing is repeated in the range of 14 pixels in the x-axis direction (the horizontal direction) and 7 pixels in the y-axis direction (the vertical direction) from the start coordinate (2, 4).

Then, as described above in FIG. 10, based on the carry interval 909, any one of the tile coordinate transformation matrices 905 to 908 in FIG. 9B is selected at each tile position, and each tile is rendered.

As an example, in a case where in FIG. 11B, coordinate (x, y) is, for example, a tile position corresponding to a pixel at (9, 4), this tile is the fourth tile in the x-axis direction. "4" of the tile position in the x-axis direction is a multiple of "2", which is Iw of the carry interval 909 in FIG. 9B. Thus, "1" is substituted for "i". Further, in a case where coordinate (x, y) is a tile position corresponding to the pixel at (9, 4), this tile is the first tile in the y-axis direction. "1" of the tile position is not a multiple of "4", which is Ih of the carry interval 909 in FIG. 9B. Thus, "0" is substituted for "j". Consequently, in FIG. 9B, the tile coordinate transformation matrix [1, 0] (the tile coordinate transformation matrix 907), in which i=1 and j=0, is selected. In this tile coordinate transformation matrix [1, 0], as illustrated in FIG. 9B, the a-element is "1.5", and the d-element is "1". Thus, the object in FIG. 9A is drawn as a tile of which the horizontal width of the tile size is 3 pixels, and the vertical width of the tile size is 1 pixel.

Further, in a case where in FIG. 11B, coordinate (x, y) is, for example, a tile position corresponding to a pixel at (2, 4), this tile is the first tile in the x-axis direction. "1" of the tile position in the x-axis direction is not a multiple of "2", which is Iw of the carry interval 909. Therefore, "0" is substituted for "i". Further, in a case where coordinate (x, y) is a tile position corresponding to the pixel at (2, 4), this tile is the first tile in the y-axis direction. "1" of the tile position in the y-axis direction is not a multiple of "4", which is Ih of the carry interval 909. Therefore, "0" is substituted for "j". Consequently, in FIG. 9B, the tile coordinate transformation matrix [0, 0] (the tile coordinate transformation matrix 905), in which i=0 and j=0, is selected. In this tile coordinate transformation matrix [0, 0], as illustrated in FIG. 9B, the a-element is "1", and the d-element is "1". Thus, the object in FIG. 9A is drawn as a tile of which the horizontal width of the tile size is 2 pixels, and the vertical width of the tile size is 1 pixel.

If, as in FIGS. 9B and 11B, the four tile coordinate transformation matrices 802 are generated, and one tile coordinate transformation matrix is selected at each tile position based on the carry interval 909, the horizontal width and the vertical width of the tile size of each tile in the device coordinate system are integer widths. Consequently, the drawing start coordinates of respective tiles do not include a decimal part for coordinates in pixel units, and are integer coordinates in the device coordinate system. Thus, in the examples of FIGS. 9B and 11B, the raster image 202 is generated that is approximately the same as that in the case of tile drawing in which bitmapped tile images scaled to the resolution of a raster image are arranged in a tiled manner.

Further, in the case of the present exemplary embodiment, data added by changing the drawing command 201 is only three affine transformation matrices of the tile coordinate transformation matrix 802 and the carry interval 803. Thus, it is possible to suppress an increase in operation memory during rendering.

As described above, in the present exemplary embodiment, a tile coordinate transformation matrix can be selected (switched) based on the position of a tile. Consequently, according to the present exemplary embodiment, in tile drawing, an increase in the amount of memory used for rendering is suppressed, while each tile size is an integer size in a device coordinate system. Further, it is possible to generate an image of an excellent drawing result that does not cause a gap or an overlap between tiles.

In the first exemplary embodiment described above, a tile coordinate transformation matrix that does not include a rotation and a movement has been taken as an example. Alternatively, a tile coordinate transformation matrix may be, for example, a coordinate transformation matrix including a rotation. FIGS. 12A and 12B are diagrams each illustrating an example of format of the parameters of a tile drawing command in a case where a tile coordinate transformation matrix including a 90-degree rotation is used, according to a second exemplary embodiment. FIG. 12A illustrates an example of the parameter format of the tile drawing command before the change. FIG. 12B illustrates an example of the parameter format of the tile drawing command after the change. In the case of the tile coordinate transformation matrix including a 90-degree rotation, a rotation angle of 90 degrees is specified by a b-element and a c-element of an affine transformation matrix.

A description is given below of an example in which a tile coordinate transformation matrix 1205 in FIG. 12B is calculated from a tile coordinate transformation matrix 1202 in FIG. 12A. In FIG. 12B, as described above in FIGS. 3 and 8, a tile origin 1203 and a tile range 1204 are obtained from a tile origin 1200 and a tile range 1201, respectively, in FIG. 12A. Further, in FIG. 12B, as described above in FIG. 8, a carry interval 1206 is also obtained.

From the tile coordinate transformation matrix 1202 in FIG. 12A, four tile coordinate transformation matrices [0, 0], [0, 1], [1, 0], and [1, 1] are generated, in which "i" and "j" of [i, j] of the tile coordinate transformation matrix 1205 in FIG. 12B are "0" or "1". In the case of the tile coordinate transformation matrix 1205 in FIG. 12B, in the tile coordinate transformation matrix [0, 0], b[i, j] is b[0, 0], and c[i, j] is c[0, 0]. Similarly, in the tile coordinate transformation matrix [0, 1], b[i, j] is b[0, 1], and c[i, j] is c[0, 1]. In the tile coordinate transformation matrix [1, 0], b[i, j] is b[1, 0], and c[i, j] is c[1, 0]. In the tile coordinate transformation matrix [1, 1], b[i, j] is b[1, 1], and c[i, j] is c[1, 1]. Further, as the initial values of the b-elements and the c-elements of the four tile coordinate transformation matrices [0, 0] to [1, 1], the same values as those of a b-element and a c-element of the tile coordinate transformation matrix 1202 in FIG. 12A are used.

Then, in the case of the second exemplary embodiment, the drawing command change unit 103 changes the b-elements of the four tile coordinate transformation matrices 1205 of which the initial values are set. More specifically, the drawing command change unit 103 changes the b-elements of the tile coordinate transformation matrices [0, 0] and [0, 1], in which "i" is "0", to values obtained by a division calculation of formula (7). Further, the drawing command change unit 103 changes the b-elements of the tile coordinate transformation matrices [1, 0] and [1, 1], in which "i" is "1", to values obtained by a division calculation of formula (8).

{floor(the vertical width of the tile size)÷the horizontal width of the object in the input coordinate system}   formula (7)

{ceil(the vertical width of the tile size)÷the horizontal width of the object in the input coordinate system}   formula (8)

A floor(n) and a ceil(n) are similar to those described above.

Similarly, the drawing command change unit 103 changes the c-elements of the four tile coordinate transformation matrices 1205 of which the initial values are set. More specifically, the drawing command change unit 103 changes the c-elements of the tile coordinate transformation matrices [0, 0] and [1, 0], in which "j" is "0", to values obtained by a division calculation of formula (9). Further, the drawing command change unit 103 changes the c-elements of the tile coordinate transformation matrices [0, 1] and [1, 1], in which "j" is "1", to values obtained by a division calculation of formula (10).

{floor(the horizontal width of the tile size)÷the vertical width of the object in the input coordinate system}   formula (9)

{ceil(the horizontal width of the tile size)÷the vertical width of the object in the input coordinate system}   formula (10)

A floor(n) and a ceil(n) are similar to those described above.

Using these formulas (7) to (10), the drawing command change unit 103 generates the tile coordinate transformation matrix 1205 in FIG. 12B from the tile coordinate transformation matrix 1202 in FIG. 12A. The four tile coordinate transformation matrices [0, 0] to [1, 1] in the tile coordinate transformation matrix 1205 in FIG. 12B are examples of fifth to eighth matrices.

According to the second exemplary embodiment, a tile coordinate transformation matrix including a 90-degree rotation can be selected (switched) based on the position of a tile. Thus, in tile drawing, it is possible to suppress an increase in the amount of memory used for rendering, while generating an image of an excellent drawing result. Further, in the case of the second exemplary embodiment, data added by changing the drawing command 201 is only three affine transformation matrices of the tile coordinate transformation matrix 1205 and the carry interval 1206. Thus, it is possible to suppress an increase in operation memory during rendering.

In the second exemplary embodiment described above, an example of a tile drawing command in a case where a 90-degree rotation is performed has been described. In a third exemplary embodiment, a tile drawing command including an arbitrary rotation is described. FIGS. 13A and 13B are diagrams each illustrating an example of the parameter format of a tile drawing command including an arbitrary rotation. FIG. 13A illustrates an example of a parameter format of the tile drawing command including an arbitrary rotation. FIG. 13B illustrates an example of a parameter format of the tile drawing command after the change. Further, in the third exemplary embodiment, in FIG. 13B, similarly to the above, a tile origin 1303 and a tile range 1304 are obtained from a tile origin 1300 and a tile range 1301, respectively, in FIG. 13A. Further, in FIG. 13B, as described above in FIG. 8, a carry interval 1306 is also obtained.

In the case of a tile coordinate transformation matrix 1305 in FIG. 13B, a tile coordinate transformation matrix 1307 is generated in addition to a tile coordinate transformation matrix 1302 in FIG. 13A. The tile coordinate transformation matrix 1307 is a coordinate transformation matrix for scaling coordinates so that the horizontal width and the vertical width of the tile size in a case where any rotation is performed by the tile coordinate transformation matrix 1302 are integer widths in the device coordinate system. In the third exemplary embodiment, the tile size in the case of including an arbitrary rotation refers to the size of a rectangular area surrounding a tile after being rotated in the device coordinate system. The tile coordinate transformation matrix 1307 in FIG. 13B is an affine transformation matrix. A u-element of the matrix represents a scaling factor in the x-direction of the rectangular area, and a v-element of the matrix represents a scaling factor in the y-direction of the rectangular area.

A description is given below of an example in which the tile coordinate transformation matrix 1307 in FIG. 13B is calculated. Similarly to the above, the tile coordinate transformation matrix 1307 in FIG. 13B is generated as four tile coordinate transformation matrices [0, 0], [0, 1], [1, 0], and [1, 1], in which "i" and "j" of [i, j] are "0" or "1". In the case of the tile coordinate transformation matrix 1307 in FIG. 13B, in the tile coordinate transformation matrix [0, 0], a u-element is u[0, 0], and a v-element is v[0, 0]. Similarly, in the tile coordinate transformation matrix [0, 1], a u-element is u[0, 1], and a v-element is v[0, 1]. In the tile coordinate transformation matrix [1, 0], a u-element is u[1, 0], and a v-element is v[1, 0]. In the tile coordinate transformation matrix [1, 1], a u-element is u[1, 1], and a v-element is v[1, 1].

Then, in the case of the third exemplary embodiment, in the four tile coordinate transformation matrices 1307, the drawing command change unit 103 uses as the u-elements of the tile coordinate transformation matrices [0, 0] and [0, 1], in which "i" is "0", values obtained by a division calculation of formula (11). Further, the drawing command change unit 103 uses as the u-elements of the tile coordinate transformation matrices [1, 0] and [1, 1], in which "i" is "1", values obtained by a division calculation of formula (12).

{floor(the horizontal width of the tile size)÷the horizontal width of the tile size}   formula (11)

{ceil(the horizontal width of the tile size)÷the horizontal width of the tile size}   formula (12)

A floor(n) and a ceil(n) are similar to those described above.

Further, the drawing command change unit 103 uses as the v-elements of the tile coordinate transformation matrices

[0, 0] and [1, 0], in which "j" is "0", values obtained by a division calculation of formula (13). Further, the drawing command change unit 103 uses as the v-elements of the tile coordinate transformation matrices [0, 1] and [1, 1], in which "j" is "1", values obtained by a division calculation in formula (14).

$$\{\text{floor(the vertical width of the tile size)} \div \text{the vertical width of the tile size}\} \quad \text{formula (13)}$$

$$\{\text{ceil(the vertical width of the tile size)} \div \text{the vertical width of the tile size}\} \quad \text{formula (14)}$$

A floor(n) and a ceil(n) are similar to those described above.

Using these formulas (11) to (14), the drawing command change unit 103 generates the tile coordinate transformation matrix 1307 in FIG. 13B. The four tile coordinate transformation matrices [0, 0] to [1, 1] in the tile coordinate transformation matrix 1307 in FIG. 13B are examples of ninth to twelfth matrices. Then, if the drawing command change unit 103 changes the tile drawing command as in FIG. 13B, the raster image processing unit 104 performs rendering based on the tile drawing command in FIG. 13B.

According to the third exemplary embodiment, a tile coordinate transformation matrix including an arbitrary rotation can be selected (switched) based on the position of a tile. Thus, in tile drawing, it is possible to suppress an increase in the amount of memory used for rendering, while generating an image of an excellent drawing result. Further, in the case of the third exemplary embodiment, data added by changing the drawing command 201 is only four affine transformation matrices of the tile coordinate transformation matrix 1307 and the carry interval 1306. Thus, it is possible to suppress an increase in operation memory during rendering.

In the first to third exemplary embodiments described above, only a tile coordinate transformation matrix in the tile drawing command is switched based on the tile position. Alternatively, the tile drawing command itself may be switched for each tile. In this case, the tile drawing command includes tile coordinate transformation matrices different depending on tile positions and similar to those described in the first to third exemplary embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the exemplary embodiments of the present invention have been described in detail, the present exemplary embodiments are not limited to such particular exemplary embodiments, but can be modified and changed in various manners within the scope of the present invention described in the appended claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-142797, filed Jul. 17, 2015, which is hereby incorporated by reference herein in its entirety.

What is claimed is:

1. A method for generating a raster image according to a tile drawing command, the method comprising:
    acquiring a tile drawing command in a vector format for repeatedly rasterizing an object within a tile onto an area in a predetermined direction;
    determining whether a width of the tile according to the acquired tile drawing command is an integer pixel width in a coordinate system of the raster image;
    based on a width of the area and a determination that the width of the tile is not the integer pixel width in the coordinate system, changing the width of the tile to a first integer pixel width and to a second integer width different from the first integer pixel,
    rasterizing, based on the first and second integer width, the object within a first tile whose width is the first integer pixel width repeatedly and the object within a second tile whose width is the second integer pixel width to the area to generate the raster image.

2. The method according to claim 1, wherein the rasterization includes:
    selecting any one of the plurality of pieces of information based on positions where the object is repeatedly rasterized, and
    scaling the object based on the selected piece of information.

3. The method according to claim 1, wherein each of the plurality of pieces of information is a coordinate transformation matrix.

4. An image processing apparatus comprising:
    at least one processor; and
    a memory device,
    wherein the at least one processor executes instructions in the memory device to:
    acquire a tile drawing command for repeatedly drawing in a tiled manner one or more objects specified as tile drawing targets, to generate a raster image;
    determine whether, in a case where the one or more objects are to be subjected to tile drawing based on the acquired tile drawing command, widths in an x-axis direction and a y-axis direction of a tile in a coordinate system of the raster image are integer widths in the coordinate system of the raster image; and
    change, based on the determination, the acquired tile drawing command that commands drawing of a tile of which widths in the x-axis direction and the y-axis direction are not integer widths to first tile drawing command that commands drawing a title of which widths in the x-axis direction and the y-axis direction are the integer widths and second tile drawing command that commands drawing a tile of which widths in the x-axis direction and the y-axis direction are the integer widths.

5. The image processing apparatus according to claim 4, wherein the at least one processor executes instructions in the memory device to: repeatedly place, based on the changed tile drawing command, repeatedly place the one or more objects in a tiled manner in the coordinate system of the raster image and draw a tile based on each of the one or more placed objects.

6. The image processing apparatus according to claim 5, wherein the at least one processor executes instructions in the memory device to:
generate from a coordinate transformation matrix that is among a plurality of parameters included in the acquired tile drawing command and that is a parameter for transforming an input coordinate system of the one or more objects to the coordinate system of the raster image, a plurality of coordinate transformation matrices for rounding up or rounding down a decimal part of a width in a pixel unit in the coordinate system of the raster image when the input coordinate system of the one or more objects is transformed into the coordinate system of the raster image,
set, according to order of placement of the tiles when the one or more objects are repeatedly placed in a tiled manner in the coordinate system of the raster image, a carry interval at which the decimal part of the width in the pixel unit in the coordinate system of the raster image is rounded up or rounded down when the input coordinate system of the one or more objects is transformed to the coordinate system of the raster image, and
set as the changed tile drawing command a tile drawing command including the plurality of coordinate transformation matrices and the carry interval as parameters, and
select, when the one or more objects are repeatedly placed in a tiled manner in the coordinate system of the raster image based on the changed tile drawing command, one of the plurality of coordinate transformation matrices at a position of each tile based on the carry interval and the order of placement of the tiles when the one or more objects are repeatedly placed in a tiled manner in the coordinate system of the raster image.

7. The image processing apparatus according to claim 6, wherein the at least one processor executes instructions in the memory device to:
use an affine transformation matrix as the coordinate transformation matrix change the acquired title drawing command,
generate a first matrix in which a first element for specifying a scaling factor of the affine transformation matrix is an element obtained by dividing a width obtained by rounding down a decimal part included in the width in the x-axis direction of the tile, by a width in an x-axis direction of the one or more objects in the input coordinate system, and a second element for specifying a scaling factor of the affine transformation matrix is an element obtained by dividing a width obtained by rounding down a decimal part included in the width in the y-axis direction of the tile, by a width in a y-axis direction of the one or more objects in the input coordinate system,
generate a second matrix in which the first element of the affine transformation matrix is an element obtained by dividing the width obtained by rounding down the decimal part included in the width in the x-axis direction of the tile, by the width in the x-axis direction of the one or more objects in the input coordinate system, and the second element of the affine transformation matrix is an element obtained by dividing a width obtained by rounding up the decimal part included in the width in the y-axis direction of the tile, by the width in the y-axis direction of the one or more objects in the input coordinate system,
generate a third matrix in which the first element of the affine transformation matrix is an element obtained by dividing a width obtained by rounding up the decimal part included in the width in the x-axis direction of the tile, by the width in the x-axis direction of the one or more objects in the input coordinate system, and the second element of the affine transformation matrix is an element obtained by dividing the width obtained by rounding down the decimal part included in the width in the y-axis direction of the tile, by the width in the y-axis direction of the one or more objects in the input coordinate system,
generate a fourth matrix in which the first element of the affine transformation matrix is an element obtained by dividing the width obtained by rounding up the decimal part included in the width in the x-axis direction of the tile, by the width in the x-axis direction of the one or more objects in the input coordinate system, and the second element of the affine transformation matrix is an element obtained by dividing the width obtained by rounding up the decimal part included in the width in the y-axis direction of the tile, by the width in the y-axis direction of the one or more objects in the input coordinate system, and
set, as a carry interval set according to order of placement of the tiles in the x-axis direction when the one or more objects are repeatedly placed in a tiled manner in the coordinate system of the raster image, a value obtained by further rounding up a decimal part of a value obtained by dividing 1 by the decimal part included in the width in the x-axis direction of the tile, and sets, as a carry interval set according to the order of placement of the tiles in the y-axis direction when the one or more objects are repeatedly placed in a tiled manner in the coordinate system of the raster image, a value obtained by further rounding up a decimal part of a value obtained by dividing 1 by the decimal part included in the width in the y-axis direction of the tile.

8. The image processing apparatus according to claim 6, wherein the at least one processor executes instructions in the memory device to:
use an affine transformation matrix as the coordinate transformation matrix to change the acquired title drawing command,
generate a fifth matrix in which a third element for specifying a rotation angle of the affine transformation matrix is an element obtained by dividing a width obtained by rounding down a decimal part included in the width in the y-axis direction of the tile, by a width in an x-axis direction of the one or more objects in the input coordinate system, and a fourth element for specifying a rotation angle of the affine transformation matrix is an element obtained by dividing a width obtained by rounding down a decimal part included in the width in the x-axis direction of the tile, by a width in a y-axis direction of the one or more objects in the input coordinate system, generate a sixth matrix in which the third element of the affine transformation matrix is an element obtained by dividing the width obtained by rounding down the decimal part included in the width in the y-axis direction of the tile, by the width in the x-axis direction of the one or more objects in the input coordinate system, and the fourth element of the affine transformation matrix is an element obtained by dividing a width obtained by rounding up the decimal part included in the width in the x-axis direction of the tile, by the width in the y-axis direction of the one or more objects in the input coordinate system, generate a seventh matrix in which the third element of the affine transformation matrix is an element obtained by dividing a width obtained by rounding up the decimal part included in the width in the y-axis direction of the tile, by the width in the x-axis direction of the one or more objects in the input coordinate system, and the fourth element of the affine transformation matrix is an element obtained by dividing the width obtained by rounding down the decimal part included in the width in the x-axis direction of the tile, by the width in the y-axis direction of the one or more objects in the input coordinate system, and generate an eighth matrix in which the third element of the affine transformation matrix is an element obtained by dividing the width obtained by rounding up the decimal part included in the width in the y-axis direction of the tile, by the width in the x-axis direction of the one or more objects in the input coordinate system, and the fourth element of the affine transformation matrix is an element obtained by dividing the width obtained by rounding up the decimal part included in the width in the x-axis direction of the tile, by the width in the y-axis direction of the one or more objects in the input coordinate system.

9. The image processing apparatus according to claim 5, wherein, in a case where a plurality of parameters included in the acquired tile drawing command include as a parameter a coordinate transformation matrix for performing coordinate transformation including a rotation when transforming an input coordinate system of the one or more objects to the coordinate system of the raster image, and the one or more objects are to be subjected to tile drawing by transforming the input coordinate system of the one or more objects to the coordinate system of the raster image by the coordinate transformation matrix for performing the coordinate transformation including a rotation, the at least one processor executes instructions in the memory device to whether widths in the x-axis direction and the y-axis direction of a rectangular area surrounding the tile in the coordinate system of the raster image are integer widths in the coordinate system of the raster image, wherein the at least one processor executes instructions in the memory device to:

generate for the rectangular area surrounding the tile, in a case where the widths in the x-axis direction and the y-axis direction of the rectangular area surrounding the tile are not the integer widths, a plurality of coordinate transformation matrices for rounding up or rounding down a decimal part of a width in a pixel unit in the coordinate system of the raster image, set, according to order of placement of the tiles when the one or more objects are repeatedly placed in a tiled manner in the coordinate system of the raster image, a carry interval at which the decimal part of the width in the pixel unit in the coordinate system of the raster image is rounded up or rounded down when the input coordinate system of the one or more objects is transformed to the coordinate system of the raster image, and set as the changed tile drawing command a tile drawing command further including the plurality of coordinate transformation matrices and the carry interval as parameters, and select, when the one or more objects are repeatedly placed in a tiled manner in the coordinate system of the raster image based on the changed tile drawing command, one of the plurality of coordinate transformation matrices at a position of each tile based on the carry interval and the order of placement of the tiles when the one or more objects are repeatedly placed in a tiled manner in the coordinate system of the raster image.

10. The image processing apparatus according to claim 9, wherein the at least one processor executes instructions in the memory device to:

use an affine transformation matrix as the coordinate transformation matrix to change the acquired title drawing command, generate a ninth matrix in which a first element for specifying a scaling factor of the affine transformation matrix is an element obtained by dividing a width obtained by rounding down a decimal part included in the width in the x-axis direction of the rectangular area surrounding the tile, by the width in the x-axis direction of the rectangular area, and a second element for specifying a scaling factor of the affine transformation matrix is an element obtained by dividing a width obtained by rounding down a decimal part included in the width in the y-axis direction of the rectangular area, by the width in the y-axis direction of the rectangular area, generate a tenth matrix in which the first element of the affine transformation matrix is an element obtained by dividing the width obtained by rounding down the decimal part included in the width in the x-axis direction of the rectangular area, by the width in the x-axis direction of the rectangular area, and the second element of the affine transformation matrix is an element obtained by dividing a width obtained by rounding up the decimal part included in the width in the y-axis direction of the rectangular area, by the width in the y-axis direction of the rectangular area, generate an eleventh matrix in which the first element of the affine transformation matrix is an element obtained by dividing a width obtained by rounding up the decimal part included in the width in the x-axis direction of the rectangular area, by the width in the x-axis direction of the rectangular area, and the second element of the affine transformation matrix is an element obtained by dividing the width obtained by rounding down the decimal part included in the width in the y-axis direction of the rectangular area, by the width in the y-axis direction of the rectangular area, generate a twelfth matrix in which the first element of the affine transformation matrix is an element obtained by dividing the width obtained by rounding up the decimal part included in the width in the x-axis direction of the rectangular area, by the width in the x-axis direction of the rectangular area, and the second element of the affine transformation matrix is an element obtained by dividing the width obtained by rounding up the decimal part included in the width in the y-axis direction of the rectangular area, by the width in the y-axis direction of the rectangular area, and set, as a carry interval set in association with order of placement of the tiles in the x-axis direction when the one or more objects are repeatedly placed in a tiled manner in the coordinate system of the raster image, a value obtained by further rounding up a decimal part of a value obtained by dividing 1 by a decimal part included in the width in the x-axis direction of the tile, and sets, as a carry interval set in association with order of placement of the tiles in the y-axis direction when the one or more objects are repeatedly placed in a tiled manner in the coordinate system of the raster image, a value obtained by further rounding up a decimal part of a value obtained by dividing 1 by a decimal part included in the width in the y-axis direction of the tile.

11. An image processing method comprising:

acquiring a tile drawing command in a vector format for repeatedly rasterizing one or more objects onto an area in a predetermined direction, to generate a raster image;

determining whether widths in an x-axis direction and a y-axis direction of a tile in a coordinate system of the raster image are integer widths in the coordinate system of the raster image according to the acquired tile drawing command;

based on a width of the area and a determination that the widths in the x-axis and the y-direction of the tile are not the integer pixel width in the coordinate system, changing the width of the tile to a first integer pixel width and to a second integer width different from the first integer pixel; and rasterizing, based on the first and the second integer pixel widths, the object within a second tile whose width is the second integer pixel width to the area to generate the raster image.

* * * * *